United States Patent
Kawahara

(10) Patent No.: US 12,313,537 B2
(45) Date of Patent: May 27, 2025

(54) HOLDER FOR DRYING, METHOD OF MANUFACTURING MEASUREMENT SAMPLE, AND MEASUREMENT METHOD

(71) Applicant: Shimadzu Corporation, Kyoto (JP)

(72) Inventor: Kazumi Kawahara, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 170 days.

(21) Appl. No.: 18/108,791

(22) Filed: Feb. 13, 2023

(65) Prior Publication Data

US 2023/0258557 A1 Aug. 17, 2023

(30) Foreign Application Priority Data

Feb. 17, 2022 (JP) .................. 2022-023213

(51) Int. Cl.
| | |
|---|---|
| *G01N 21/3559* | (2014.01) |
| *G01N 1/31* | (2006.01) |
| *G01N 1/36* | (2006.01) |
| *G01N 1/44* | (2006.01) |

(52) U.S. Cl.
CPC ......... *G01N 21/3559* (2013.01); *G01N 1/312* (2013.01); *G01N 1/36* (2013.01); *G01N 1/44* (2013.01); *G01N 2201/021* (2013.01)

(58) Field of Classification Search
CPC ...... G01N 21/3559; G01N 1/312; G01N 1/36; G01N 1/44; G01N 2201/021; G01N 21/3581; G01N 2021/0339; G01N 21/03; G01N 2021/3595; G01N 21/3577; G01N 21/3563; G01N 2021/3572; B01L 2300/0681; B01L 9/52; B01L 3/5023; B01L 2300/0832; B01L 2300/126
See application file for complete search history.

(56) References Cited

U.S. PATENT DOCUMENTS

| | | | | |
|---|---|---|---|---|
| 5,545,376 A | * | 8/1996 | Honigs | G01N 1/4077 422/561 |
| 2005/0239211 A1 | | 10/2005 | Uchihara et al. | |
| 2007/0229094 A1 | | 10/2007 | Kasai et al. | |

FOREIGN PATENT DOCUMENTS

| | | | | |
|---|---|---|---|---|
| JP | 61-195347 | | 8/1986 | |
| JP | 2001-188032 | | 7/2001 | |
| JP | 2005291823 A | * | 10/2005 | ............ B01L 3/5088 |
| JP | 2006-317153 | | 11/2006 | |
| JP | 2009-222615 | | 10/2009 | |
| JP | 2017-032348 | | 2/2017 | |
| JP | 2021-135204 | | 9/2021 | |
| JP | 2022-145106 | | 10/2022 | |

OTHER PUBLICATIONS

Extended European search report issued Jun. 16, 2023 in European Patent Application No. 23156462.6.

* cited by examiner

*Primary Examiner* — Kiho Kim
(74) *Attorney, Agent, or Firm* — Wenderoth, Lind & Ponack, L.L.P.

(57) ABSTRACT

A holder for drying includes a first member including a first tubular portion that protrudes like a tube and an annular second member that can fix filter paper in a flat state under tension by being fitted over the filter paper to surround an outer side of the first tubular portion while the filter paper is carried on the first tubular portion.

4 Claims, 4 Drawing Sheets

HOLDER FOR DRYING, METHOD OF MANUFACTURING MEASUREMENT SAMPLE, AND MEASUREMENT METHOD

BACKGROUND OF THE INVENTION

Field of the Invention

The present invention relates to a holder for drying, a method of manufacturing a measurement sample, and a measurement method.

Description of the Background Art

Fourier transform infrared spectroscopy (FTIR) has been known as a method of analyzing an object. Japanese Patent Laying-Open No. 2021-135204 describes an exemplary Fourier transform infrared spectrophotometer for performing this method. The Fourier transform infrared spectrophotometer includes an infrared source. Infrared rays emitted from the infrared source pass through a prescribed optical system and thereafter a sample is irradiated therewith. Infrared rays that have passed through the sample are detected by a detector.

In an example where an object to be measured is provided as being contained in a liquid, filter paper is impregnated with this liquid and measurement is conducted with this filter paper being adopted as a sample. After the filter paper is impregnated with the liquid containing the object and before measurement with a Fourier transform infrared spectrophotometer is conducted, the filter paper is dried. Drying, however, causes wrinkles in the filter paper. The filter paper where wrinkles were caused has a significantly irregular surface. Therefore, in an attempt to conduct measurement on this surface with the Fourier transform infrared spectrophotometer, it is difficult to adjust the focus. In some cases, measurement has to be conducted with the focus not sufficiently being adjusted, which results in poor accuracy in measurement data.

SUMMARY OF THE INVENTION

An object of the present invention is to provide a holder for drying, a method of manufacturing a measurement sample, and a measurement method that allow highly accurate measurement with Fourier transform infrared spectroscopy.

In order to achieve the object, a holder for drying based on the present invention includes a first member including a first tubular portion that protrudes like a tube and an annular second member that can fix filter paper impregnated with a liquid containing an object in a flat state under tension by being fitted over the filter paper to surround an outer side of the first tubular portion while the filter paper is carried on the first tubular portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
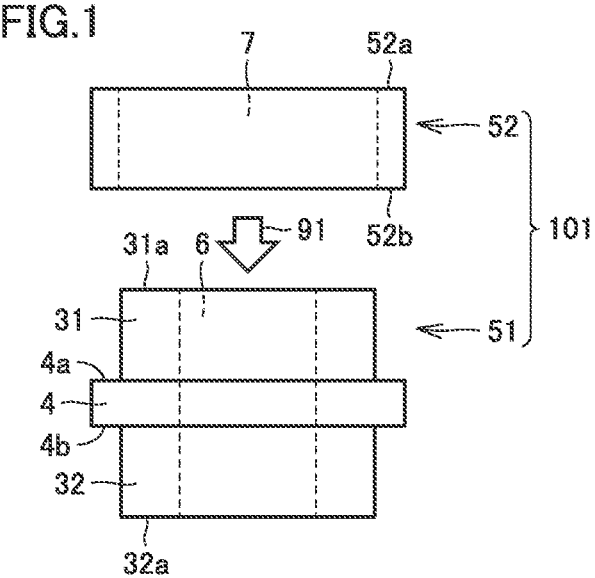
FIG. 1 is an illustrative view of a holder for drying in a first embodiment based on the present invention.

A holder for drying in a first embodiment based on the present invention will be described with reference to FIGS. 1 to 6. FIG. 1 shows a holder for drying 101 in the present embodiment.

Figure 2:
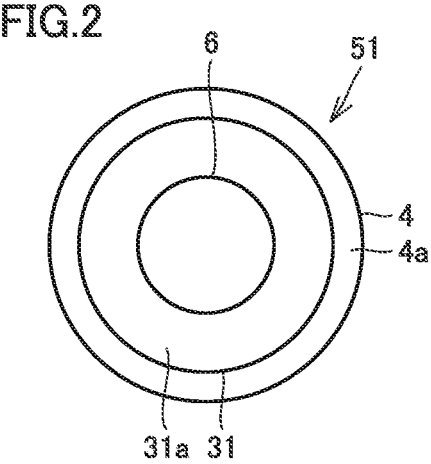
FIG. 2 is an illustrative view of a first member provided in the holder for drying in the first embodiment based on the present invention.

Holder for drying 101 includes a first member 51 and a second member 52. FIG. 2 shows a plan view of first member 51. First member 51 includes an opening 6. First member 51 includes a first tubular portion 31 that protrudes like a tube. First tubular portion 31 is in a shape of a circular tube. First tubular portion 31 includes a surface 31a at an upper end. As shown in FIG. 1, first member 51 includes a second tubular portion 32 that protrudes in a direction opposite to first tubular portion 31, in addition to first tubular portion 31. Second tubular portion 32 includes a surface 32a at a lower end. First member 51 includes an annular projecting portion 4 that projects outward around an outer peripheral surface. In an example shown here, projecting portion 4 includes an upper surface 4a and a lower surface 4b. First member 51 is in a shape symmetric in an upward/downward direction. Opening 6 in first member 51 may be a through hole.

Figure 3:
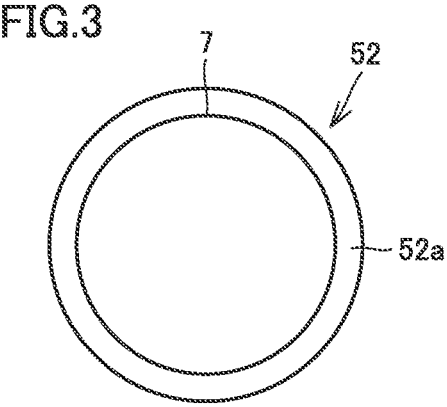
FIG. 3 is an illustrative view of a second member provided in the holder for drying in the first embodiment based on the present invention.

Second member 52 includes an upper end 52a and a lower end 52b. In the example shown here, upper end 52a and lower end 52b are flat surfaces, however, upper end 52a and lower end 52b are not necessarily flat surfaces. FIG. 3 shows a plan view of second member 52. Second member 52 is annular. Second member 52 includes an opening 7. Opening 7 is a through hole.

Figure 4:
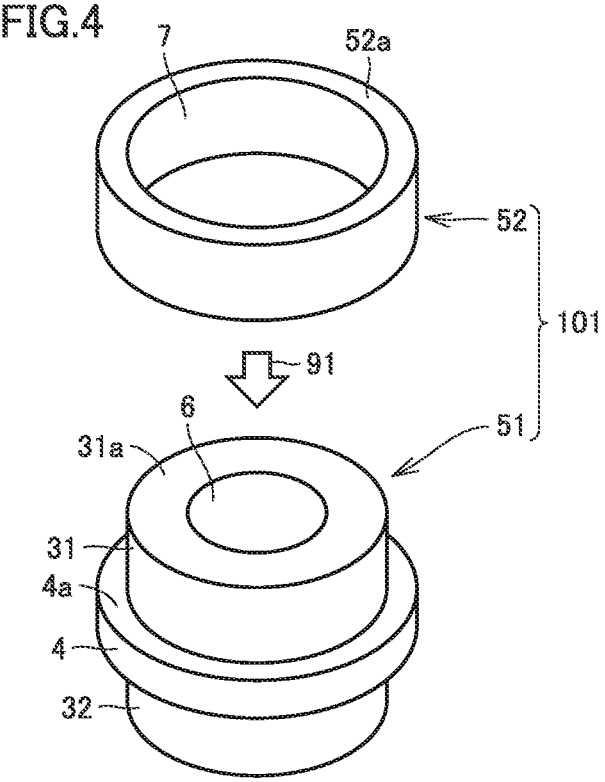
FIG. 4 is a perspective view of the holder for drying in the first embodiment based on the present invention.
Figure 5:
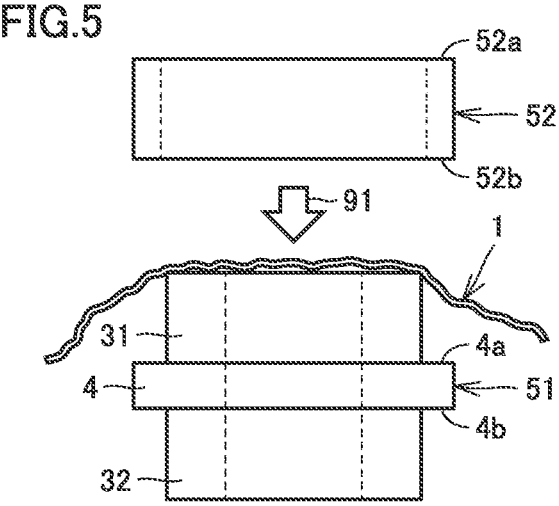
FIG. 5 is a first illustrative view of how the holder for drying is used in the first embodiment based on the present invention.
Figure 6:
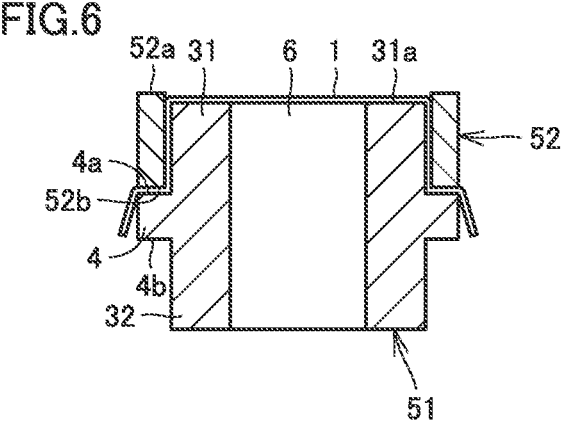
FIG. 6 is a second illustrative view of how the holder for drying is used in the first embodiment based on the present invention.

FIG. 4 shows a perspective view of holder for drying 101. FIGS. 5 and 6 show how holder for drying 101 is used. In FIG. 5, wet filter paper 1 is placed on first tubular portion 31. Filter paper 1 is impregnated with a liquid containing an object. The object is, for example, a fine solid. As shown with an arrow 91 in FIG. 5, second member 52 is applied from above. Thus, first tubular portion 31 enters opening 7 in second member 52 while it pushes to bend filter paper 1. As application of second member 52 ends, a state shown in FIG. 6 is set. FIG. 6 is a cross-sectional view of a state in which filter paper 1 is fixed to holder for drying 101. In this state, filter paper 1 is in a flat state as being pulled toward an outer periphery at least at the upper surface of first tubular portion 31 and opening 6.

Second member 52 can thus fix filter paper 1 impregnated with the liquid containing the object as being flat under tension by being fitted over filter paper 1 to surround an outer side of first tubular portion 31 while filter paper 1 is carried on first tubular portion 31.

Holder for drying 101 is a jig for drying filter paper 1 to set the filter paper into a state available as a sample. As shown in FIG. 6, after wet filter paper 1 is fixed, it is dried with an appropriate method. Holder for drying 101 where filter paper 1 is fixed may be left stand for natural drying, or may be placed in some drying chamber for a certain time period or longer. For example, hot air may be sent toward holder for drying 101 where filter paper 1 is fixed.

Holder for drying 101 in the present embodiment can fix filter paper 1 under tension by sandwiching filter paper 1 between first member 51 and second member 52. Consequently, filter paper 1 can be dried as being fixed in a flat state. Therefore, this holder for drying 101 can make a sample with a flat surface, and highly accurate measurement with Fourier transform infrared spectroscopy can be conducted.

As shown in the present embodiment, preferably, first tubular portion 31 is in a shape of a circular tube. By adopting this construction, at the upper surface of filter paper 1, the filter paper can be pulled equally toward the entire perimeter. First member 51 can conveniently be used regardless of an orientation thereof, because first tubular portion 31 is in the shape of the circular tube. Though first tubular portion 31 is in the shape of the circular tube in the present embodiment, it is merely by way of example and may be in a shape of a tube with a cross-sectional shape other than a circular shape.

As shown in the present embodiment, preferably, first member 51 includes annular projecting portion 4 around the outer peripheral surface and projecting portion 4 is arranged such that filter paper 1 is sandwiched between lower end 52b of second member 52 and upper surface 4a of projecting portion 4. By adopting this construction, filter paper 1 can firmly be fixed by being sandwiched. Though an example in which lower end 52b of second member 52 is the flat surface is shown in the present embodiment, a similar effect is achieved even when lower end 52b of second member 52 is not the flat surface.

Though an example in which filter paper 1 impregnated with a liquid containing an object is prepared and second member 52 is fitted over filter paper 1 to surround the outer side of first tubular portion 31 while filter paper 1 is carried on first tubular portion 31 is described, this is merely by way of example. The order of operations is not limited as such. For example, filter paper 1 that has not yet been impregnated with a liquid containing an object may be prepared and second member 52 may be fitted over filter paper 1 to surround the outer side of first tubular portion 31 while filter paper 1 is carried on first tubular portion 31. Thus, after filter paper 1 is fixed to holder for drying 101 and becomes flat, filter paper 1 may be impregnated with a liquid containing an object. Even in such a case as well, filter paper 1 can be dried while it is fixed in a flat state and a sample with a flat surface can be made.

(Experiment)

Figure 7:
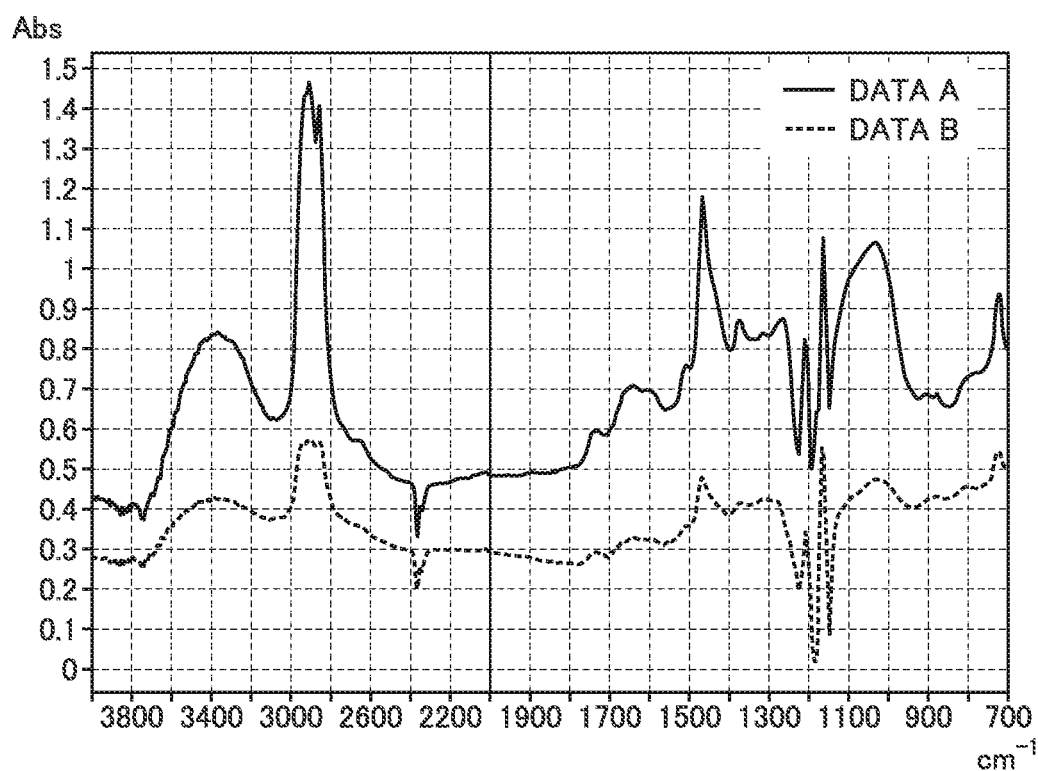
FIG. 7 shows a graph of data obtained by measurement with Fourier transform infrared spectroscopy conducted for each of samples made with and without the holder for drying in the first embodiment based on the present invention.

The inventors prepared two types of filter paper 1 each impregnated with a liquid containing an object. From one type, a sample was made by drying with the use of holder for drying 101 in the present embodiment. From the other type, a sample was made by drying with a conventional method without the use of the holder. These two samples were used and subjected to measurement with Fourier transform infrared spectroscopy, and obtained data was compared. FIG. 7 shows measurement data obtained from the two samples. FIG. 7 shows a graph of absorbance for data A and B. Data A originated from the sample obtained with the use of holder for drying 101. Data B originated from the sample obtained by drying with the conventional method. Data A was sufficient in intensity of absorbance, and a peak was readily observed. Data B was low in intensity of absorbance, and a peak tended to be ambiguous.

As set forth above, it could be confirmed that highly accurate measurement with Fourier transform infrared spectroscopy could be conducted by drying with holder for drying 101 in the present embodiment.

Second Embodiment

Figure 8:
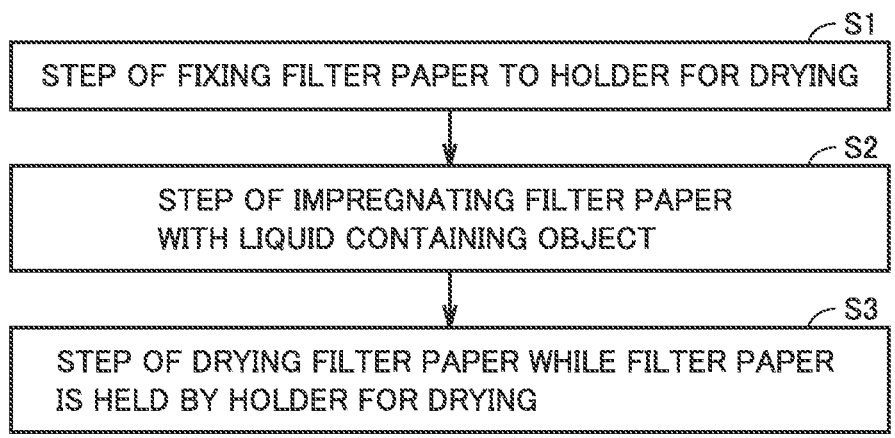
FIG. 8 is a flowchart of a method of manufacturing a measurement sample in a second embodiment based on the present invention.

A method of manufacturing a measurement sample in a second embodiment based on the present invention will be described with reference to FIG. 8. FIG. 8 shows a flowchart of the method of manufacturing a measurement sample in the present embodiment. The method of manufacturing a measurement sample in the present embodiment includes a step S1 of fixing filter paper to a holder for drying, a step S2 of impregnating the filter paper with a liquid containing an object, and a step S3 of drying the filter paper while the filter paper is held by the holder for drying. The "holder for drying" herein includes a first member including a first tubular portion that protrudes like a tube and an annular second member that can fix the filter paper in a flat state under tension by being fitted over the filter paper to surround an outer side of the first tubular portion while the filter paper is carried on the first tubular portion. The "holder for drying" herein may be, for example, holder for drying 101 described in the first embodiment.

According to the method of manufacturing a measurement sample in the present embodiment, the filter paper impregnated with a liquid containing an object can be dried in a flat state under tension, and therefore a sample with a flat surface can be obtained. Therefore, highly accurate measurement with Fourier transform infrared spectroscopy can be conducted.

Third Embodiment

Figure 9:
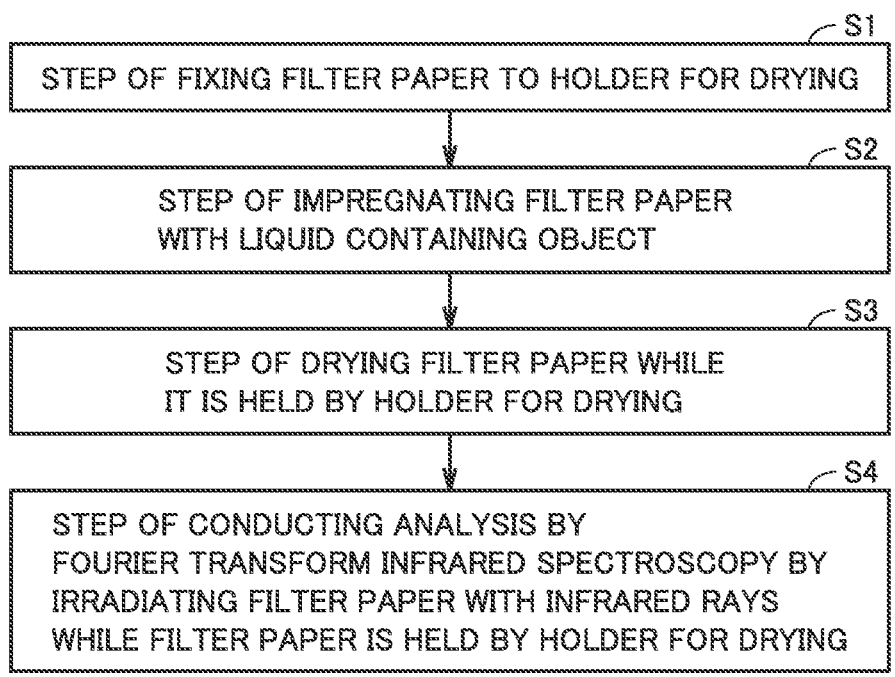
FIG. 9 is a flowchart of a measurement method in a third embodiment based on the present invention.

A measurement method in a third embodiment based on the present invention will be described with reference to FIG. 9. FIG. 9 shows a flowchart of the measurement method in the present embodiment. The measurement method in the present embodiment includes a step S1 of fixing filter paper to a holder for drying, a step S2 of impregnating the filter paper with a liquid containing an object, a step S3 of drying the filter paper while the filter paper is held by the holder for drying, and a step S4 of conducting analysis by Fourier transform infrared spectroscopy by irradiating the filter paper with infrared rays while the filter paper is held by the holder for drying after the drying step. The "holder for drying" herein includes a first member including a first tubular portion that protrudes like a tube and an annular second member that can fix the filter paper in a flat state under tension by being fitted over the filter paper to surround an outer side of the first tubular portion while the filter paper is carried on the first tubular portion. The "holder for drying" herein may be, for example, holder for drying 101 described in the first embodiment.

According to the measurement method in the present embodiment, after the filter paper impregnated with a liquid containing an object is dried while it is fixed in a flat state, analysis by Fourier transform infrared spectroscopy is conducted, which hence enables highly accurate measurement. Therefore, highly accurate measurement with Fourier transform infrared spectroscopy can be conducted.

As set forth here, not only a sample may be made by drying filter paper 1 while it is fixed to holder for drying 101 but also analysis by Fourier transform infrared spectroscopy may be conducted by irradiation of filter paper 1 with infrared rays while filter paper 1 remains fixed to holder for drying 101. Thus, time and efforts for moving a sample to another holder can be saved. Thus, the sample can preferably more reliably be maintained in the flat state.

Though an example in which holder for drying 101 includes second tubular portion 32 is described in the first embodiment, the holder for drying does not have to include second tubular portion 32. Though an example in which first tubular portion 31 and second tubular portion 32 are the same in shape is shown in the first embodiment, they may be the same or different from each other in shape. A ratio of a dimension of the holder for drying shown in FIGS. 1 to 6 is merely by way of example, and it is not necessarily as such. The holder for drying does not have to include, for example, projecting portion 4.

Some features in embodiments above may be adopted as being combined as appropriate.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A holder for drying comprising:
    a first member including a first tubular portion that protrudes like a tube, and an annular projecting portion extending around an outer peripheral surface of the first tubular portion, the annular projecting portion projecting radially outward from the outer peripheral surface of the first tubular portion; and
    an annular second member configured to fix filter paper in a flat state under tension by being fitted over the filter paper so as to surround an outer side of the first tubular portion while the filter paper extends across an end of the first tubular portion, and such that a portion of the filter paper is sandwiched between a lower end surface of the second member and an upper surface of the annular projecting portion.

2. The holder for drying according to claim 1, wherein the first tubular portion is in a shape of a circular tube.

3. A method of manufacturing a measurement sample comprising:
    fixing filter paper to a holder for drying, wherein the holder includes
        a first member including a first tubular portion that protrudes like a tube, and an annular projecting portion extending around an outer peripheral surface of the first tubular portion, the annular projecting portion projecting radially outward from the outer peripheral surface of the first tubular portion, and
        an annular second member configured to fix the filter paper in a flat state under tension;
    impregnating the filter paper with a liquid containing an object; and
    drying the filter paper while the filter paper is held by the holder for drying, wherein
    the fixing of the filter paper includes fitting the annular second member over the filter paper so as to surround an outer side of the first tubular portion while the filter paper xtends across an end of the first tubular portion, and such that a portion of the filter paper is sandwiched between a lower end surface of the second member and an upper surface of the annular projecting portion.

4. A measurement method comprising:
    fixing filter paper to a holder for drying, wherein the holder includes
        a first member including a first tubular portion that protrudes like a tube, and an annular projecting portion extending around an outer peripheral surface of the first tubular portion, the annular projecting portion projecting radially outward from the outer peripheral surface of the first tubular portion, and
        an annular second member configured to fix the filter paper in a flat state under tension;
    impregnating the filter paper with a liquid containing an object;
    drying the filter paper while the filter paper is held by the holder for drying; and
    conducting analysis by Fourier transform infrared spectroscopy by irradiating the filter paper with infrared rays while the filter paper is held by the holder for drying after the drying of the filter paper, wherein
    the fixing of the filter paper includes fitting the annular second member over the filter paper so as to surround an outer side of the first tubular portion while the filter paper xtends across an end of the first tubular portion, and such that a portion of the filter paper is sandwiched between a lower end surface of the second member and an upper surface of the annular projecting portion.

* * * * *